US008117243B2

(12) United States Patent
Vick et al.

(10) Patent No.: US 8,117,243 B2
(45) Date of Patent: Feb. 14, 2012

(54) DYNAMIC TRANSACTIONAL INSTANTIATION OF SYSTEM CONFIGURATION USING A VIRTUAL FILE SYSTEM LAYER

(75) Inventors: Christopher A. Vick, San Jose, CA (US); Michael H. Paleczny, San Jose, CA (US); Olaf Manczak, Hayward, CA (US)

(73) Assignee: Oracle America, Inc., Redwood City, CA (US)

( * ) Notice: Subject to any disclaimer, the term of this patent is extended or adjusted under 35 U.S.C. 154(b) by 1009 days.

(21) Appl. No.: 12/035,154

(22) Filed: Feb. 21, 2008

(65) Prior Publication Data

US 2009/0216990 A1 Aug. 27, 2009

(51) Int. Cl.
*G06F 12/00* (2006.01)
*H04N 7/173* (2006.01)
(52) U.S. Cl. ........................................ 707/824; 725/100
(58) Field of Classification Search .......................... None
See application file for complete search history.

(56) References Cited

U.S. PATENT DOCUMENTS

| 7,437,764 | B1 * | 10/2008 | Sobel et al. ..................... 726/25 |
| 7,805,409 | B2 * | 9/2010 | Manczak et al. ............... 707/638 |
| 2004/0054894 | A1 * | 3/2004 | Lambert ....................... 713/165 |
| 2006/0080370 | A1 * | 4/2006 | Torii et al. ..................... 707/204 |
| 2007/0233880 | A1 * | 10/2007 | Nieh et al. ..................... 709/227 |

* cited by examiner

*Primary Examiner* — Tarek Chbouki
(74) *Attorney, Agent, or Firm* — Marsh Fischmann & Breyfogle LLP; Kent A. Lembke

(57) ABSTRACT

A virtual configuration system, comprising a virtualization engine and a configuration engine, for the dynamic instantiation of configuration files is disclosed. A mechanism is disclosed that allows for transactional updates to a repository of configuration settings comprising multiple files. Configuration entries are stored in a first memory location and a copy of the entries is stored in a second memory location. A virtual configuration file that includes a virtual configuration for each entry is created and used to provide the operating system with path and location information regarding the configuration entries. Simultaneously and during run-time of the computer, the configuration entries stored in the second memory location can be modified. Once the modifications are complete, a second virtual configuration file is created referencing the configuration entries stored at the second memory location. The first virtual configuration file is thereafter atomically replaced by the second virtual configuration file.

7 Claims, 2 Drawing Sheets

DYNAMIC TRANSACTIONAL INSTANTIATION OF SYSTEM CONFIGURATION USING A VIRTUAL FILE SYSTEM LAYER

RELATED APPLICATION

This application is related to the subject matter disclosed in U.S. patent application Ser. No. 12/035,132 filed on Feb. 21, 2008 for "Dynamic Composition of an Execution Environment from Multiple Immutable File System Images" now U.S. Pat. No. 7,805,409 and U.S. patent application Ser. No. 12/035,102 filed on Feb. 21, 2008 for "Pluggable Extensions to Virtual Machine Monitors", both of which are co-assigned to Sun Microsystems, Inc., assignee of the present invention, the disclosures of which are herein specifically incorporated by this reference.

BACKGROUND OF THE INVENTION

1. Field of the Invention

Embodiments of the present invention relate, in general, to systems and methods for configuration file management and particularly to dynamic instantiation of configuration files.

2. Relevant Background

A software package such as an application or operating system typically comprises a number of data files that are identical on all systems and a small number of configuration files that vary from system to system. These configuration files enable the otherwise identical files to be operational on multiple platforms. It is within these configuration files that the same program knows how to interact with a particular version of an operating system. For example, when a user begins the traditional installation process of a software application, the installer either asks or determines independently the type and version of the computer's operating system. From that information particular aspects of the configuration file work to modify the otherwise identical files so that the application can function properly.

Often such configuration files are among multiple applications or packages. For example, multiple configuration files may commonly identify the host name of a computer as "/etc/hostname" configuration file. The syntax of the file typically determines what information is provided. This information, typically in ASCII text, can be created or modified by a human user via a text editor. Thus configuration files, the files controlling the operation of an application, can be modified. However, it is not uncommon for multiple configuration files, typically used by different applications or packages, to contain redundant information.

Many software applications access a relevant set of configuration files only once to retrieve information that is needed for the operation of the program. Other applications access configuration files every time the information is needed. And, yet, other applications cache configuration data and re-read it periodically or upon a specific event.

Typically, the configuration files are created during an initial system installation. However, it is not uncommon for the configuration parameters to change after the initial installation. Such a change can result in a modification of one or more configuration files. For the change to take effect, any application and operating component controlled by any of the changed parameters must restart. This can be accomplished either by a restart of the whole system (reboot), or by a restart of the relevant individual applications and operating system components if such a restart operation is supported by the operating system.

However, applications and operating system components may read the configuration files while the configuration files are being changed. This can result in an inconsistent or even incorrect view of configuration data leading to disastrous results. For example, assume that an application requires configuration files A, B, and C and that the application retrieves information from the files as needed. Assume further that a change is required to each of the configuration files. So while the file change may be complete for file A, ongoing for B, and yet to be accomplished for C, the system may access files A, B, and C for data. The result is data that is inconsistent and possibly incompatible. Until the change is complete the application is unreliable.

Compartmentalization of the configuration (customization) settings in a collection of simple ASCII files rather than, for example, a structured database, allows for a broad range of tools capable of manipulating configuration data, including a variety if editing programs, script interpreters, etc. However, a collection of regular files lacks transactional properties. This means that mutators (programs that change the settings) and accessors (programs that access the settings) of the configuration settings may have an inconsistent (invalid) view of the settings.

For example, consider that an application requires configuration files A and B. Further, consider that mutator programs X and Y are executing concurrently and making different changes to A and B. Both programs read both A and B and then write new versions of these files (AX, BX, AY, and BY respectively). It is possible that the mutator program X writes the file A first, then Y writes files A and B and then X writes file B. In such a case the resulting state will be AY and BX, and it might be inconsistent thus making the application unreliable.

When software is controlled by a single vendor it is possible to minimize this problem by combining all the configuration settings in a single transactional repository for configuration services, e.g. registry in Windows® or netinfo database in MacOS®. However, this approach is impractical in the UNIX/LINUX environment. UNIX/LINUX migration from a collection of regular ASCII configuration files to a single transactional repository would require modifications to hundreds if not thousands of applications developed by hundreds of different developers.

File system virtualization layer described in co-pending and commonly assigned U.S. patent application Ser. No. 12/035,132 entitled "Dynamic Composition of an Execution Environment from Multiple Immutable File System Images" now U.S. Pat. No. 7,805,409, the contents of which are incorporated by reference in their entirety, can combine (overlay) multiple immutable file system trees into a single virtual tree. Thus, one can identify and separate all the configuration files that differ between systems, create for each system an immutable file system image with the most current version of configuration data, and use file system virtualization to overlay the configuration tree over the file system content common for all the systems.

In this approach, the locations (pathnames) and the contents of the configuration files in the immutable file system image are identical to the regular configuration files—thus there is no difference to the configuration consumers. However, to make a change to any of the configuration files, one must modify the original copy of the file (kept somewhere else), then recreate the immutable file system image, and finally rebuild and replace the virtual tree. While the later steps of this process can be easily automated, the configuration providers would have to modify the configuration files in a copy of the file image different from the one accessed by the consumers. This change might have only trivial implications when the configuration files are generated from some other repository, but it might require substantial changes to the legacy system administration software.

SUMMARY OF THE INVENTION

Embodiments of the present invention provide a mechanism that allows for dynamic transactional updates to a repository of configuration settings. These transactions comprise updates to multiple configuration files and guarantee atomicity, isolation and consistency. Atomicity, for the purpose of this description, is understood to mean that when the transaction succeeds, all files are modified, and when it fails none of the files are modified. One mechanism of the present invention guarantees that a partial update will not occur. Isolation, for the purpose of this description, means that while updates to the files involved are performed the results cannot be observed until the transaction is complete. Finally, consistency is understood to mean, for the purpose of this description, that the updates preserve the internal integrity of the repository.

As all of the configuration files are associated with one data structure (with an internal file system structure), the entire configuration can be easily preserved and/or separated from the software environment to which the configuration is applied.

Embodiments of the present invention provide the same benefits of a single transactional repository while not requiring all of the applications to be so associated. Management tools can modify the configuration settings so as to leave applications that only read configuration settings unchanged.

Embodiments of the present invention also provide a mechanism configured to mutate certain files existing in an otherwise immutable file structure. According to one embodiment of the present invention, a virtual configuration system is comprised of a virtualization engine and a configuration engine. The configuration engine extracts from immutable file images configuration entries and stores those files in a memory location associated with the operating system of a computer or similar device. In another embodiment of the present invention, the configuration engine transforms a set of configuration parameters creating a collection of new configuration files. Thereafter, and within a virtual file system that is associated with the root file system of the computer, a virtual configuration file is formed. The virtual configuration files include path and location information regarding the actual location of the configuration files.

The configuration engine also copies the configuration entries to a second memory location. Access to the immutable file images is gained via corresponding virtual file entries. Thus during normal operations, the virtual configuration files directly access requests to the configuration files stored in the first memory location. According to an embodiment of the present invention, the configuration engine is configured to modify at least one of the copies of the configuration files stored in a second memory location. The virtualization engine then creates a second virtual configuration file that is associated with the now modified configuration files stored in the second memory location. Thereafter, and according to a predetermined condition or rule, the first virtual configuration file is replaced with the second virtual configuration file. Once replaced, the old first virtual configuration file, and indeed the configuration files stored in the first memory location, can be removed. It is noteworthy that the modification and replacement of the configuration files, and their associated virtual configuration file, is accomplished while the operating system is running, i.e. during run-time.

Once the changes to the configuration files are complete, and upon issuance of a change commit, the virtualized file structure is combined with all the pending updates into a single message. This message causes the virtualized file structure to be altered as if a new immutable file system has been added to the virtualized file structure. Armed with the new immutable files, the operating system will turn to the newly modified configuration file without any loss of service. Once the new configuration files are presented to and utilized by the applicable software, the old configuration files can be removed harmlessly from memory.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims may be necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
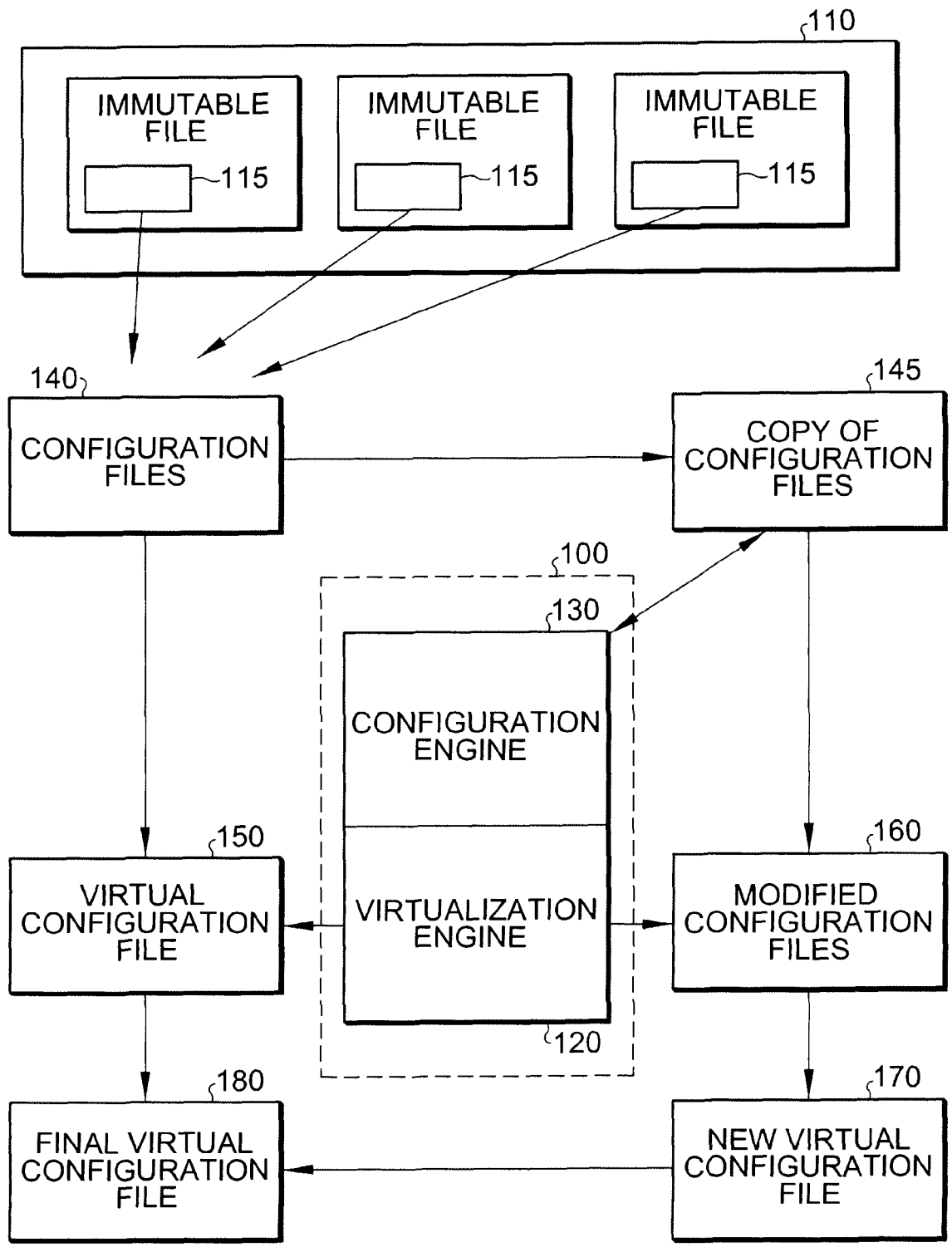
FIG. 1 shows a high level block diagram of a virtual configuration system according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Disclosed herein is a system and method for dynamic and transactional instantiation of configuration files. Briefly stated, the present invention enables dynamic modification and replacement of configuration files associated with a computer system. By forming a copy of an immutable configuration file, modifications to configuration files can take place while a virtual file system directs normal access to an unaltered copy maintained in a different memory location. Upon completion of the modification or update, a new virtual configuration file replaces the existing virtual configuration file and directs any subsequent access request for configuration information to the modified and updated configuration files.

For purposes of the present invention, the term "dynamic" is defined to mean when the system is running, i.e. during run-time. Similarly, while the present disclosure is presented using immutable file images, one skilled in the art will appreciate that the present invention can be used with or without immutable software images as long as a virtual file system unifies other file systems.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 generally shows a high level block diagram of a virtual configuration system 100 according to one embodiment of the present invention. A virtual configuration system 100, comprising a virtualization engine 120 and a configuration engine 130, dynamically instantiates configuration files in an immutable file system. According to one embodiment of the present invention, the configuration engine 130 examines file system(s) 110 containing software environments (operating system and applications) mounted on the root file system and extracts from them configuration parameters 115. In another embodiment of the present invention, the configuration engine 130 can transform a set of configuration parameters 115 to create a collection of new configuration files rather than extract the files. Each extracted configuration parameter 115 is placed in a configuration file 140 which is stored in memory at a first location. The configuration engine 130 further copies or generates virtual configuration files 150 in the virtual configuration data structure. After all the configuration files 140 have been added, the configuration engine 130 passes the immutable virtual configuration data structure to the virtualization engine 120.

The virtualization engine 120 thereafter creates a virtual configuration file 150 associated with the configuration files 140 stored in the first memory location. This virtual configuration file 150 includes path and location information for each configuration entry stored in memory at the first location. As an application seeks access to an immutable file 110, the request is directed to the virtual configuration file 150 which in turn provides location and path information to the actual configuration entry 115 stored in memory.

A new transaction is created for each new instance that a management tool connects to the configuration engine 130. The management tool passes to the configuration engine 130 either changes to the configuration parameters 115, which the configuration engine 130 uses for generation of the virtual configuration files 140, or the actual content of the virtual configuration files. When the management tool finishes modification, the configuration engine 130 attempts to complete (close) the transaction. When there are multiple concurrent transactions the configuration engine 130 can either exclude all but one transaction or restart conflicting transactions once the configuration engine 130 closes the first transaction. Alternatively, the configuration engine 130 can use more sophisticated techniques known to one skilled in the art such as transaction processing techniques.

According to one embodiment of the present invention, a configuration file entry modification or update can be accomplished dynamically, i.e. during operating system run-time. To accomplish such a modification, the configuration engine 130 can act on a copy of the configuration file 145 stored in memory at a second location. Alternatively, and according to another embodiment of the present invention, the configuration engine 130 can allocate for each transaction in progress a separate location in memory just for storing changes to the configuration files introduced by that transaction. While the immutable files 110 and operating system utilize the configuration file 140 and entries stored in memory at the first memory location, the configuration files 145 stored in memory at the second memory location are modified. It should be noted that the term "virtual configuration file" refers to a virtual configuration entry while the term "virtual configuration data structure" (or virtual configuration image) refers to the data structure/file combining all of the configuration files.

The resulting modification of the files stored at the second memory location creates a modified configuration file 160. The virtualization engine 120 thereafter forms a second or new virtual configuration file 170. This new virtual configuration file includes path and location information to configuration file entries 145 stored in memory at the second memory location. This includes any modified or updated configuration entries.

The virtualization engine 120 thereafter replaces the present virtual configuration file 150 with the new virtual configuration file 170 resulting in a final virtual configuration file 180. The replacement of the current virtual configuration file with the new/modified virtual configuration file occurs according to pre-determined criteria or rules. These criterion may include a lack of pending access request by the immutable file images 110 or idle system time. Furthermore, and according to another embodiment of the present invention, the replacement of the virtual configuration file is atomic and provides full isolation. With respect to the present invention, atomic replacement refers to an all or nothing replacement. Thus an atomic replacement of the virtual configuration file would be a complete replacement of all virtual configuration file entries regardless of the number of entries that were modified or updated.

Once the current virtual configuration file is replaced, all subsequent inquires to the virtual configuration file will be directed to configuration files stored in the second memory location. Configuration entries stored in the first memory location, and indeed the virtual configuration file associated with the entries stored in the first memory location, can be removed. Once removed, a new copy of the current configuration files can be created and stored restarting the process of dynamic configuration file mutation.

Figure 2:
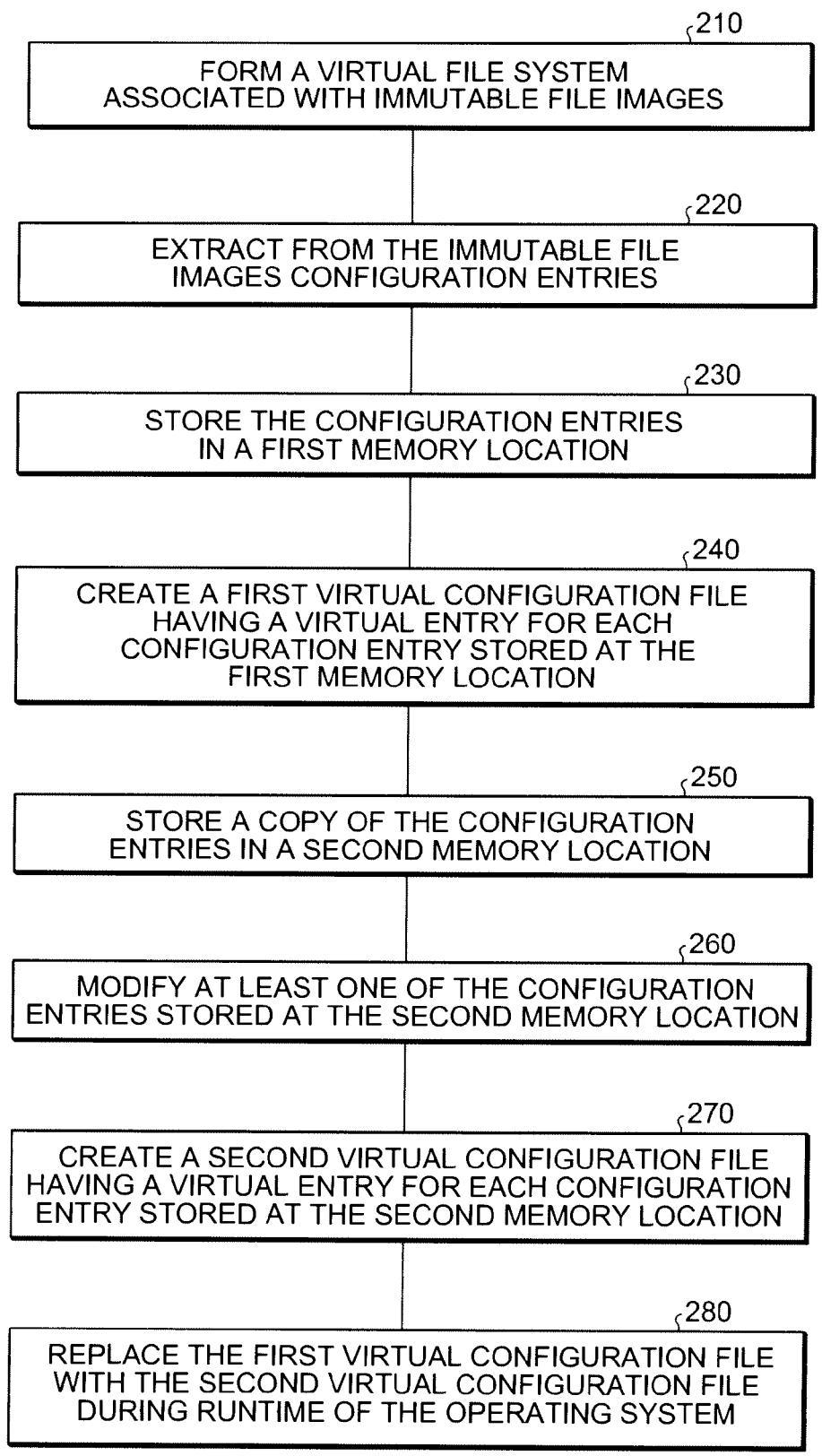
FIG. 2 shows a high level flowchart of one method embodiment for dynamically altering configuration files according to the present invention.

FIG. 2 depicts a high level flowchart of one method embodiment for dynamically altering configuration files related to immutable file images during operating system run-time. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

According to one embodiment of the present invention, a virtual file system is formed 210 that is associated with a plurality of immutable file images. With a virtual file system in place and the immutable file images resident on independent branches of an operating system's root file system, the configuration engine 130, according to one embodiment, extracts 220 configuration entries from the immutable file images and stores 230 them at a first memory location. In general a virtualization layer (virtual file system) is used to combine software with configuration files.

One embodiment of the present invention thereafter creates 240 a virtual configuration file that is associated with the virtual file system. This first virtual configuration file includes virtual configuration entries for each of the configuration files resident at the first memory location. Each entry in the virtual configuration file includes path and location information so as to locate the actual configuration file.

At substantially the same time, a copy of the configuration file entries is stored 250 at a second memory location that is separate and independent of the first memory location. This copy of configuration files can, thereafter, be updated and/or modified 260 based on changes in the operating environment. As these configuration entries reside at a separate location from the original configuration entries, and access to the original entries is via the first virtual configuration file, the copy of configuration entries is invisible to the immutable file image.

While a modification or update to configuration entries at the second memory location is ongoing, the operating system remains in run-time referring, when necessary, to the configuration entries resident at the first memory location. Upon completion of the update or modification to one or more of the configuration entries, a new, second, virtual configuration file is created 270. This second virtual configuration file includes separate virtual entries for each configuration entry located at the second memory location. As with the first virtual configuration file, these virtual entries provide path and location information for the operating system and applicable immutable file images to locate and use a particular configuration entry.

Once the second virtual configuration file is created, and according to one embodiment of the present invention, the virtual configuration system of the present invention replaces 280 the first virtual configuration file with the second virtual configuration file. The instantiation of a new virtual configuration file immediately shifts configuration entry access requests to those configuration entries located at the second memory location. Furthermore, the replacement of the virtual configuration files, and in essence the configuration entries themselves, occurs during run-time of the computer system. Accordingly, there is no need to reboot or restart the computer. Services are maintained as the system remains operational.

According to another embodiment of the present invention, a rule set can be established to govern the replacement of the configuration files so that it does not conflict with any ongoing access/read requests. For example, the replacement can be set to occur only when all read requests have been completed. As can be appreciated by one skilled in the relevant art, the rule set can be drafted to accommodate a variety of conditions.

According to another embodiment of the present invention, a method for dynamically instantiating configuration files in a virtual file system is provided. The method includes partitioning a software distribution into a universal file system tree and a machine specific file system tree wherein partitioning includes extracting from the software distribution a set of files specific to each of one or more machines. The method further includes creating for each of the one or more machines an immutable file system image of the set of files specific to that machine wherein the immutable file system image includes a file system structure. The method further includes associating each immutable file system with a virtual file system. The method further includes at run-time, forming, by the virtual file system, a virtual file structure of the software distribution by interposing the file system structure of at least one immutable file system image with the universal file system tree. In a variation of the present embodiment, the universal file system tree and the machine specific file system tree are mutually exclusive.

One advantageous aspect of the present invention is that because the plurality of configuration files are combined to a single data structure it is easy to preserve (backup) configuration data. Secondly the configuration files do not alter the software environment with which they are combined.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

While there have been described above the principles of the present invention in conjunction with specific computer virtualization architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for dynamically instantiating configuration files in a virtual file system, the method comprising:
    partitioning a software distribution into a universal file system tree and a machine specific file system tree, wherein partitioning includes extracting from the software distribution a set of configuration files specific to each of one or more machines;
    creating for each of the one or more machines an immutable file system image of the set of configuration files specific to that machine, wherein the immutable file system images are stored in a first computer-readable memory at a first memory location;
    associating each immutable file system with a virtual file system of the software distribution for one of the machines; and
    at run-time, forming with a virtualization engine a virtual file structure of the software distribution by interposing at least one immutable file system image with the universal file system tree, wherein a copied set of the configuration files are stored in a second computer-readable memory location and wherein virtual configuration files are associated with the plurality of configuration files stored in the first computer-readable memory location and the set of configuration files stored in the second computer-readable memory location; and
    with a configuration engine, modifying the set of configuration files stored in the second computer-readable memory location during run-time of the operating system, wherein the virtualization engine virtually replaces the plurality of configuration files stored in the first computer-readable memory location with modified configuration files stored in the second computer-readable memory location during run-time.

2. The method of claim 1 wherein the universal file system tree and the machine specific system tree are mutually exclusive.

3. A system for dynamic instantiation of configuration data, the system comprising:
    a first computer-readable memory;
    a software distribution partitioned into a universal file system tree and a machine specific file system tree wherein the machine specific file system tree includes a plurality of configuration files specific to each of a plurality of machines, wherein the plurality of configuration files are stored in the first computer-readable memory at a first memory location;
    a plurality of immutable file system images corresponding to each of the plurality of configuration files for each of the plurality of machines;
    a virtualization engine associated with the plurality of immutable file system images configured to interpose at least one of immutable file system images with the universal file system tree forming a virtual file system of the software distribution for one of the plurality of machines, wherein a copied set of the plurality of configuration files are stored in a second computer-readable memory location and wherein virtual configuration files are associated with the plurality of configuration files stored in the first computer-readable memory location and the plurality of configuration files stored in the second computer-readable memory location; and
    a configuration engine configured to modify the plurality of configuration files stored in the second computer-readable memory location during run-time of the operating system, wherein the virtualization engine is configured to virtually replace the plurality of configuration files stored in the first computer-readable memory location with modified configuration files stored in the second computer-readable memory location during run-time.

4. The system of claim 3 wherein the virtual file system is associated with a root file system of an operating system.

5. The system of claim 3 wherein said second computer-readable memory location is a memory buffer.

6. The system of claim 3 wherein the virtualization engine is configured to virtually replace the plurality of configuration files stored in the first computer-readable memory location with modified configuration files stored in the second computer-readable memory location atomically.

7. The system of claim 6 wherein the virtualization engine is configured to remove the plurality of configuration files stored in the first computer-readable memory location responsive to the plurality of configuration files stored in the first computer-readable memory location being replaced by configuration files stored in the second computer-readable memory location.

* * * * *